(12) United States Patent
Araujo

(10) Patent No.: US 11,098,750 B2
(45) Date of Patent: Aug. 24, 2021

(54) IN-LINE FOUR CYLINDER ENGINE HAVING NO SECONDARY FORCES OR IMBALANCE

(71) Applicant: ALFADAN, INC., Miramar, FL (US)

(72) Inventor: Alberto Francisco Araujo, Miramar, FL (US)

(73) Assignee: Alfadan, Inc., Miramar, FL (US)

(*) Notice: Subject to any disclaimer, the term of this patent is extended or adjusted under 35 U.S.C. 154(b) by 0 days.

(21) Appl. No.: 16/539,183

(22) Filed: Aug. 13, 2019

(65) Prior Publication Data

US 2020/0018346 A1 Jan. 16, 2020

Related U.S. Application Data

(63) Continuation of application No. 16/148,663, filed on Oct. 1, 2018, now Pat. No. 10,378,578.

(60) Provisional application No. 62/697,653, filed on Jul. 13, 2018.

(51) Int. Cl.
| | |
|---|---|
| F02B 75/20 | (2006.01) |
| F16C 7/02 | (2006.01) |
| F16C 35/02 | (2006.01) |
| F01B 9/02 | (2006.01) |
| F02B 75/32 | (2006.01) |
| F02B 75/18 | (2006.01) |

(52) U.S. Cl.
CPC .............. *F16C 7/023* (2013.01); *F01B 9/023* (2013.01); *F02B 75/20* (2013.01); *F02B 75/32* (2013.01); *F16C 35/02* (2013.01); *F02B 2075/1816* (2013.01); *F16C 2360/22* (2013.01)

(58) Field of Classification Search
CPC .......... F01B 9/023; F01B 9/026; F01B 9/047; F01B 13/02; F01B 13/04; F01B 3/0035
USPC ............................................. 123/58.1, 197.4
See application file for complete search history.

(56) References Cited

U.S. PATENT DOCUMENTS

| | | | | |
|---|---|---|---|---|
| 3,906,908 | A * | 9/1975 | Franke | F02B 1/00 |
| | | | | 123/317 |
| 3,968,777 | A * | 7/1976 | Franke | F01B 13/04 |
| | | | | 123/44 R |
| 4,038,954 | A * | 8/1977 | Franke | F02B 75/02 |
| | | | | 123/318 |
| 4,459,945 | A * | 7/1984 | Chatfield | F01B 9/023 |
| | | | | 123/197.2 |

(Continued)

*Primary Examiner* — George C Jin
*Assistant Examiner* — Teuta B Holbrook
(74) *Attorney, Agent, or Firm* — The Concept Law Group, PA; Scott D. Smiley; Scott M. Garrett

(57) ABSTRACT

An internal combustion engine includes one or more unopposed cylinder units where each cylinder unit drives the crankshaft via a yoke assembly rather than a conventional connecting rod. The yoke assembly is formed by a connecting rod assembly that can have an upper portion having a connecting member connected to the piston, and a lower portion. The connecting rod assembly moves exclusively along the bore axis of the cylinder, with no side to side motion. The connecting rod assembly also defines a transverse slot in the yoke portion in which a connecting rod bearing housing reciprocates with motion of a connecting rod journal on the crankshaft within the transverse slot. Since the motion of the connecting rod is linear, and the connecting rod bearing housing moves circularly, there are no secondary forces resulting in an inline engine using the unopposed cylinder unit configuration.

9 Claims, 15 Drawing Sheets

(56) References Cited

U.S. PATENT DOCUMENTS

| | | | | |
|---|---|---|---|---|
| 4,598,672 A | * | 7/1986 | Jayne | F01B 9/023 |
| | | | | 123/197.4 |
| 4,776,310 A | * | 10/1988 | Gray | F01B 9/023 |
| | | | | 123/196 R |
| 4,791,898 A | * | 12/1988 | Jayne | F01B 9/023 |
| | | | | 123/197.4 |

* cited by examiner

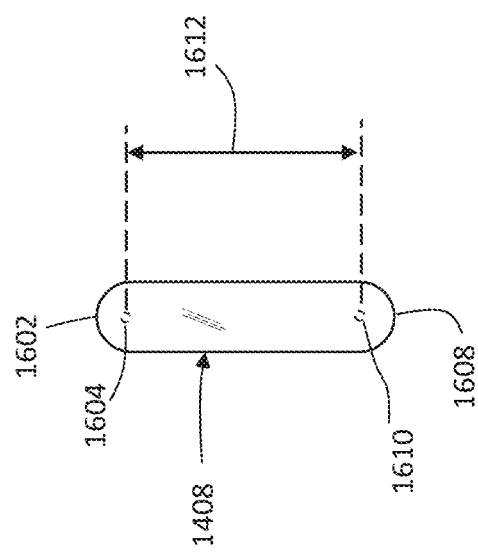

IN-LINE FOUR CYLINDER ENGINE HAVING NO SECONDARY FORCES OR IMBALANCE

CROSS REFERENCE

This application is a continuation in part of, and claims the benefit of, U.S. patent application Ser. No. 16/148,663, titled "Internal Combustion Engine Using Yoke Assemblies in Unopposed Cylinder Units," which was filed Oct. 1, 2018, and was a non-provisional application claiming priority to provisional application No. 62/697,653, filed Jul. 13, 2018, the entireties of each of which are hereby incorporated by reference.

FIELD OF THE INVENTION

The present invention relates generally to internal combustion engines, and, more particularly, relates to an internal combustion engine that uses reciprocating yoke in unopposed cylinder units where the connecting apparatus between the piston and crankshaft moves only vertically while a housing member captured in a transverse slot of the connecting apparatus reciprocates in the transverse slot and follows a circular motion with the connecting rod journal of the crankshaft.

BACKGROUND OF THE INVENTION

In many conventional internal combustion engines the pistons are connected to a crankshaft through a connecting rod. The connecting rod pivots about a point where it is attached to the piston at the top of the connecting rod, which moves mostly vertically with piston. The lower end of the connecting rod, however, reciprocates circularly with the crankshaft connecting rod journal. This conventional arrangement is used in may common engines.

One of the most common engines in automotive applications is the inline four cylinder engine. The inline four cylinder engine has been around and in production since the early 1900's but has suffered from various inherent design flaws which have limited the maximum displacement of the engine design to around 2.5 liters. The normal inline four cylinder configuration has very little rocking which typically results in smooth middle rpm range. However, these engines are known to produce a secondary imbalance, which is undesirable for high rpm. This secondary imbalance is largely caused by the fact that the pistons move together in pairs, offset in timing by 180 degrees. The two pistons moving upward toward top dead center travel a greater distance from the mid stroke position than the two pistons moving downward from the mid stroke position toward bottom dead center. This difference in travel over the same amount of time causes the secondary imbalance and creates two upward out of balance pulses per revolution. Rotational vibration on the X axis, which is often felt during idling, tend to be large because, in addition to the non-overlapping power stroke inherent in engines with 4 or fewer cylinders, the height imbalance from the connecting rods' center of gravity swinging left and right is amplified due to there being two connecting rods moving together.

For inline four cylinder engines there are three types of crankshaft designs that attempt to mitigate or dampen these undesirable forces. These designs include crankshafts with no counter weights, crankshafts that are fully counter-weighted, and crankshafts that are semi-counter or half-counter weighted. Crankshafts without counter weights were used on engines up to the mid-1930s for automobiles, but are still to be found in agricultural use (with the known imbalance problems). Without counter weight an inline four cylinder engine crank is balanced for primary forces, primary and secondary couples, but not for secondary forces. Secondary forces cannot be balanced on the crankshaft, and are address by using two contra-rotating balance shafts running at twice engine speed. These balance shafts are typically only provided on premium quality cars that demand very smooth running, or on large engines in excess of 2.4 L where the level of secondary vibration becomes obtrusive. The primary couples bend the crank to an S shape with the deflection increasing with rpm. Without counter weights this deflection causes fatigue and main bearing failures when the deflection exceeds the bearing clearance, resulting in rubs (i.e. breaches of the lubricant layer). These failures have resulted in a public perception that high rpm operation is bad for the inline four cylinder engine that lingers to this day. This has been address in some crankshafts which have two counter weights on each crank throw while other crankshafts have one counter weight on each crank throw, which are on each end of the crankshaft and on both sides of the center. The counter weights balance each other completely for primary forces and couples and have no secondary forces/couple. Many prior art engine designs have been created in an attempt to overcome the secondary imbalance forces but all are merely a solution which allows the engine vibration to not be felt by the operator while the forces are still experienced in the engine. These forces eventually overcome the lubrication film gap and cause the engine to fail.

Thus, the four cylinder inline engine design suffers from two major inherent design flaws, one being the fact that connecting rods swing in pairs from side to side and the second is the pair of pistons traveling at different speeds causing the secondary imbalance problem. Both of these conditions cause severe loads on the crankshaft and crankshaft bearings causing severe engine failures. Therefore, a need exists to overcome the problems with the prior art as discussed above.

SUMMARY OF THE INVENTION

The invention provides an internal combustion engine using unopposed cylinder units that each drive a respective yoke assembly that overcomes the hereinafore-mentioned disadvantages of the heretofore-known devices and methods of this general type and that eliminate secondary forces in an inline engine.

With the foregoing and other objects in view, there is provided, in accordance with the invention, an internal combustion engine that has a plurality of in-line, unopposed cylinder units, with each cylinder unit having a bore that defines an axis, a piston disposed in the bore that reciprocates within the bore, a piston connecting rod assembly that reciprocates exclusively along the axis of the bore in correspondence with the piston. The piston connecting rod assembly has a yoke portion defining a transverse slot that is transverse to the axis of the bore and having a connecting member that connects the yoke portion to the piston. The cylinder unit further includes a connecting rod bearing housing that is mounted in the transverse slot and that is configured to reciprocate within the transverse slot, and which is further configured to house a connecting rod bearing to interface with a connecting rod journal of a crankshaft.

In accordance with another feature, the plurality of in-line, unopposed cylinder units is four unopposed cylinder units, wherein an inner pair of the cylinder units is timed 180 degrees offset from an outer pair of cylinder units.

In accordance with another feature, the yoke portion of each piston connecting rod assembly includes outward facing slide bearings on opposing ends of the yoke portion that interface with guides in a crankcase that prevent lateral movement of the piston connecting rod assembly.

In accordance with another feature, in each cylinder unit, the connecting rod bearing housing is mounted in the transverse slot on slider bearings in a top and a bottom of the slot.

In accordance with another feature, there is further included an oil passage formed through the connecting rod bearing housing configured to pass oil to an upper bearing and a lower bearing between the connecting rod assembly and an upper and lower surface of the transverse slot, respectively, of the yoke portion.

In accordance with another feature, the cylinder units include oil passages formed at each end of the yoke portion, from the transverse slot to an exterior side of the yoke portion.

In accordance with another feature, the connecting member has a triangular shape with a widest portion at a base where the connecting member joins to the yoke portion.

In accordance with another feature, the connecting rod bearing housed in each connecting rod bearing housing is a thrust bearing.

In accordance with another feature, the connecting rod bearing housing comprises a top slide bearing on a top of the connecting rod bearing housing, and a bottom slide bearing on the bottom of the connecting rod bearing housing, and wherein the transverse slot defined in the yoke portion lacks a centering track on an upper surface that interfaces with the top slide bearing and lacks a centering track on a lower surface that interfaces with the lower slide bearing.

In accordance with some embodiments of the inventive disclosure, there is provided a an internal combustion engine that has a plurality of in-line, unopposed cylinder units. Each cylinder unit has several components. One component of each cylinder unit is a piston configured to reciprocates within a cylinder bore along a bore axis. Another component of each cylinder unit is a piston connecting rod assembly that reciprocates exclusively along the bore axis with the piston. The piston connecting rod assembly can have a yoke portion defining a transverse slot that is transverse to the bore axis and having a connecting member that connects the yoke portion to the piston, and further have an outward facing slide bearing disposed on a first end side of the yoke portion and a second end side of the yoke portion which are each respectively configured to interface with a vertical track in a crankcase of the internal combustion engine. Another component of each cylinder unit can include a connecting rod bearing housing that is mounted in the transverse slot and that is configured to reciprocate within the transverse slot, and which is further configured to house a connecting rod bearing to interface with a connecting rod journal of a crankshaft.

In accordance with another feature, the plurality of in-line, unopposed cylinder units is four unopposed cylinder units wherein an inner pair of the cylinder units is timed 180 degrees offset from an outer pair of cylinder units.

In accordance with another feature, in each cylinder unit, the connecting rod bearing housing is mounted in the transverse slot on slider bearings in a top and a bottom of the slot.

In accordance with another feature, there is an oil passage formed through the connecting rod bearing housing configured to pass oil to an upper bearing and a lower bearing between the connecting rod assembly and an upper and lower surface of the transverse slot, respectively, of the yoke portion.

In accordance with another feature, the connecting rod bearing housed in each connecting rod bearing housing is a thrust bearing.

In accordance with some embodiments of the inventive disclosure, there is also provided an in-line four cylinder engine that has exactly four cylinder units, with each cylinder unit having a cylinder bore having a bore axis. Each cylinder unit can further include a piston configured to reciprocates within the cylinder bore along the bore axis. Each cylinder unit can further include a piston connecting rod assembly that reciprocates exclusively along the bore axis with the piston. The piston connecting rod assembly can have a yoke portion defining a transverse slot that is transverse to the bore axis and having a connecting member that connects the yoke portion to the piston, and further have an outward facing slide bearing disposed on a first end side of the yoke portion and a second end side of the yoke portion which are each respectively configured to interface with a vertical track in a crankcase of the internal combustion engine. Each cylinder unit can further include a connecting rod bearing housing that is mounted in the transverse slot and that is configured to reciprocate within the transverse slot, and which is further configured to house a connecting rod bearing to interface with a connecting rod journal of a crankshaft.

Although the invention is illustrated and described herein as embodied in an internal combustion engine using unopposed cylinder units with each cylinder unit having a yoke, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Those skilled in the art can understand the specific meanings of the above-mentioned terms in the embodiments of the present invention according to the specific circumstances

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 16 is a plan view of a slider bearing used on the side of a piston connecting rod assembly, in accordance with some embodiments.

DETAILED DESCRIPTION

Figure 1:
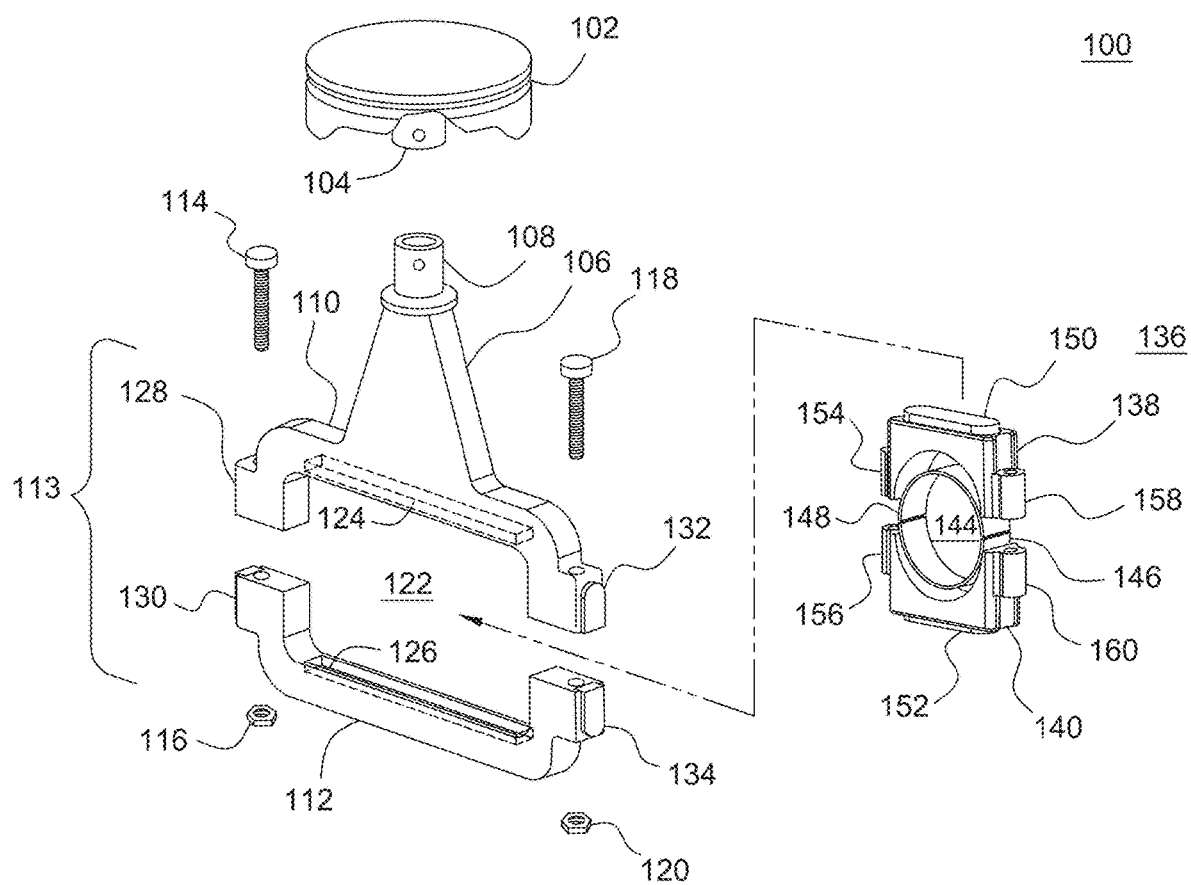
FIG. 1 is an exploded side view of a cylinder unit outside of a cylinder bore, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient internal combustion engine with multiple cylinder units. Each cylinder unit drives a yoke portion and is unopposed. Embodiments of the invention provide an internal combustion engine that has a plurality of in-line, unopposed cylinder units, with each cylinder unit having a bore that defines an axis, a piston disposed in the bore that reciprocates within the bore, a piston connecting rod assembly that reciprocates exclusively along the axis of the bore in correspondence with the piston. The piston connecting rod assembly has a yoke portion defining a transverse slot that is transverse to the axis of the bore and having a connecting member that connects the yoke portion to the piston. The cylinder unit further includes a connecting rod bearing housing that is mounted in the transverse slot and that is configured to reciprocate within the transverse slot, and which is further configured to house a connecting rod bearing to interface with a connecting rod journal of a crankshaft.

FIG. 1 is an exploded side view of a cylinder unit 100 outside of a cylinder bore, in accordance with some embodiments. In particular, the components for a yoke driven piston assembly is shown. In a given engine, there can be several such cylinder units used, however, the cylinder unit 100 is particularly suited for using in inline four cylinder engines as the cylinder unit design overcomes the limitations of those engines using conventional connecting rod technology, which causes secondary imbalance and tends to limit the displacement of such engines to around 2.5-3.0 liters in displacement to be reliable. The cylinder unit 100 includes a piston 102 having a centrally located connecting boss 104 at the bottom of the piston 102. The piston 102 can otherwise have a conventional design and is positioned in the bore of a cylinder, and reciprocates in the bore along a bore axis. The piston 102 is connected to a piston connecting rod assembly that includes a connecting portion 108 at the top of a connecting member 106 that is further connected or integrally formed with an upper portion 110 of the piston connecting rod assembly. The upper portion 110 mates with a lower portion 112 such as by bolts 114, 118 and nuts 116, 120. The upper and lower portions 110, 112 have opposing "U" shapes that form a yoke portion 113 in which is defined a transverse slot 122 between the upper and lower portions 110, 112 when the upper and lower portions 110, 112 are placed together. The slot 122 in the yoke portion is defined by a top side and a bottom side which are horizontal and at the top and bottom of the slot 122, respectively, and further by opposing end sides that are vertical, on each end of the slot. In some embodiments there may be grooves or tracks 124, 126 in the upper and lower connecting rod assembly portions 110, 112 in the top and bottom surfaces defining the slot 122. On the outer sides of the of the upper and lower portions 110, 112, are slider bearings 128, 130 and 132, 134. The slider bearings can alternatively be unitary instead of separate halves on the upper and lower portions 110, 112 as shown. The slider bearings 128-134 can be comprised of a ceramic material such as silicon nitride, and mate with a corresponding slider track (not shown) on either side of the piston connecting rod assembly to ensure the piston connecting rod assembly can only travel in the vertical direction (e.g. in the direction of the cylinder bore axis).

Disposed in the transverse slot 122, upon assembly, is a connecting rod bearing housing 136 that is comprised of an upper portion 138 and a lower portion 140 which define a circular hole 144 in which the connecting rod bearing housing 136 holds journal bearings 146, 148 which interface with a connecting rod journal of a crankshaft. On the top of the upper portion 138, and on the bottom of the lower portion 140 are slide bearings 150, 152, respectively, which interface with the upper side 124 and the lower side 126 of the transverse slot 122, and allow the connecting rod bearing housing 136 to reciprocate transversally in the slot 122. The upper 138 and lower 140 portions of the connecting rod bearing assembly 136 can be bolted together on the sides through bolt boss pairs 154, 156 and 158, 160. The connecting rod bearing assembly 136 and it's motion in the transverse slot 122 convert the linear motion of the piston connecting rod assembly into a circular motion at the connecting rod journal, causing rotation of the crankshaft. It is important to note that the cylinder unit 100 is unopposed, meaning there is no opposing cylinder unit or piston attached to the yoke formed by the upper and lower portions 110, 112 of the piston connecting rod assembly. Rather, the piston connecting rod assembly is moved by only one piston, and its axial movement is ensured by the slide bearings (128, 130 and 132, 134) on each side of the piston connecting rod assembly.

In a conventional engine, the connecting member has one end connected to the piston and travels vertically while the other end is connected to the crankshaft and travels in a circle. As a result there are secondary forces experienced due to the difference in travel time from top dead center to ninety degrees, and from ninety degrees to bottom dead center. This secondary force tends to limit the displacement of inline four cylinder engines to around 2.5 liters in many applications. However, in the inventive disclosure, since the piston rod assembly moves only vertically, and the connecting rod bearing housing 136 moves circularly, the secondary forces experienced in conventional inline four cylinder engines are substantially eliminated using four cylinder units in accordance with the assemblies of FIG. 1.

FIGS. 2-5 show a series of diagrams with a cylinder unit such as that shown in FIG. 1 in various timing positions through a full stroke cycle (i.e. down, then up—which is repeated in a four stroke engine—once for intake and compression, and once for ignition and exhaust). These figures show a side view that can be considered a partial cutaway as the cylinder wall is cutaway to show the piston, piston connecting rod assembly, and connecting rod bearing housing assembly relative to the cylinder wall and each other.

Figure 2:
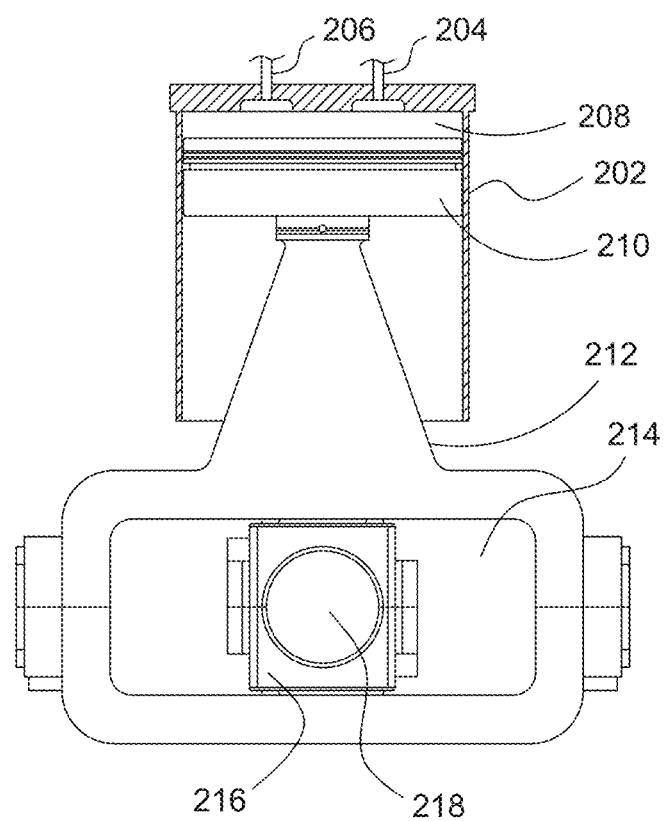
FIG. 2 is a side view of a cylinder unit at top dead center of a stroke, in accordance with some embodiments.

FIG. 2 is a side view 200 of a cylinder unit at top dead center of a stroke cycle, in accordance with some embodiments. A cylinder 202 includes valve ports 204, 206 in a cylinder head, and includes a bore 208 in which a piston 210 is disposed. The piston 210 is connected to the piston connecting rod assembly 212 that includes, for example, a connecting member, and upper portion, and a lower portion such as connecting member 106, upper portion 110, and lower portion 112 of FIG. 1. The piston connecting rod assembly 212 defines a transverse slot 214 in which a connecting rod bearing assembly 216 is disposed. The connecting rod bearing assembly 216 reciprocates in the transverse slot 214 as the piston 210 moves up and down, and defines a coupling hole 218 in which the connecting rod journal of a crankshaft will be disposed. At top dead center, the piston 210 is at the top of its stroke cycle, and the connecting rod bearing housing assembly 216 is in the center of the transverse slot 214.

Figure 3:
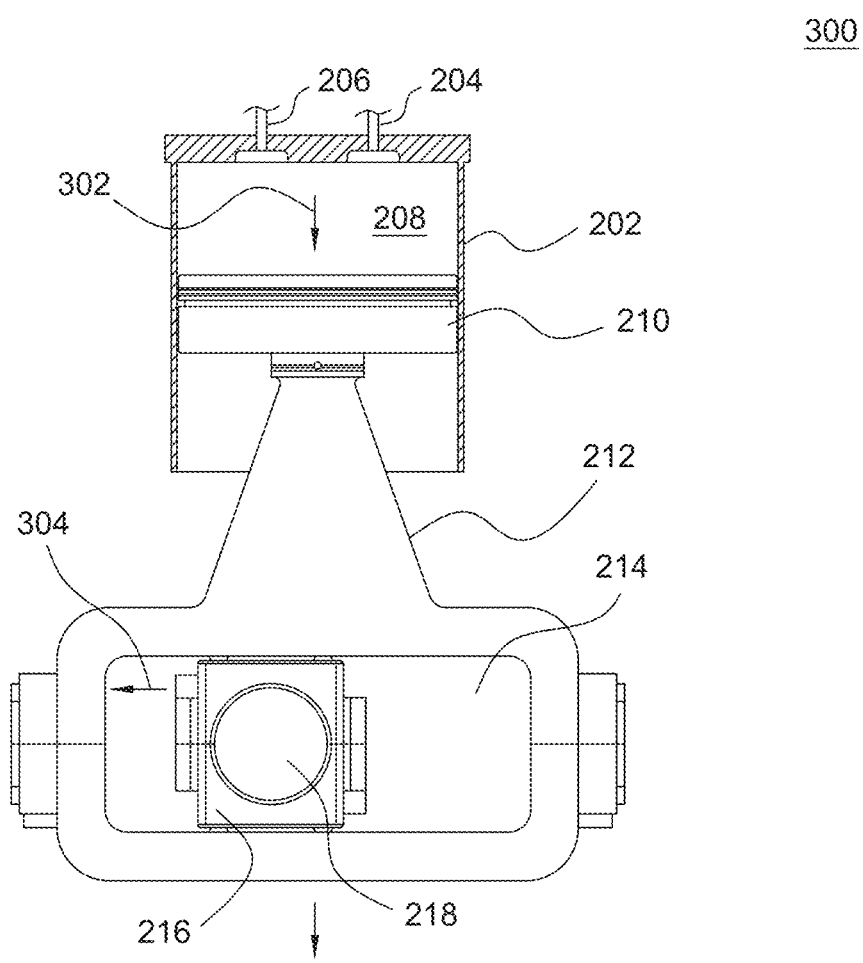
FIG. 3 is a side view of a cylinder unit at ninety degrees past top dead center of a stroke, in accordance with some embodiments.

FIG. 3 is a side view 300 of a cylinder unit at ninety degrees past top dead center of a stroke, in accordance with some embodiments. Arrow 302 indicates that the piston 210 is moved downward about halfway to the bottom of its range of motion. As a result, as indicated by arrow 304, the connecting rod bearing housing assembly 216 has moved to the left and is at its farthest leftward deviation from center.

Figure 4:
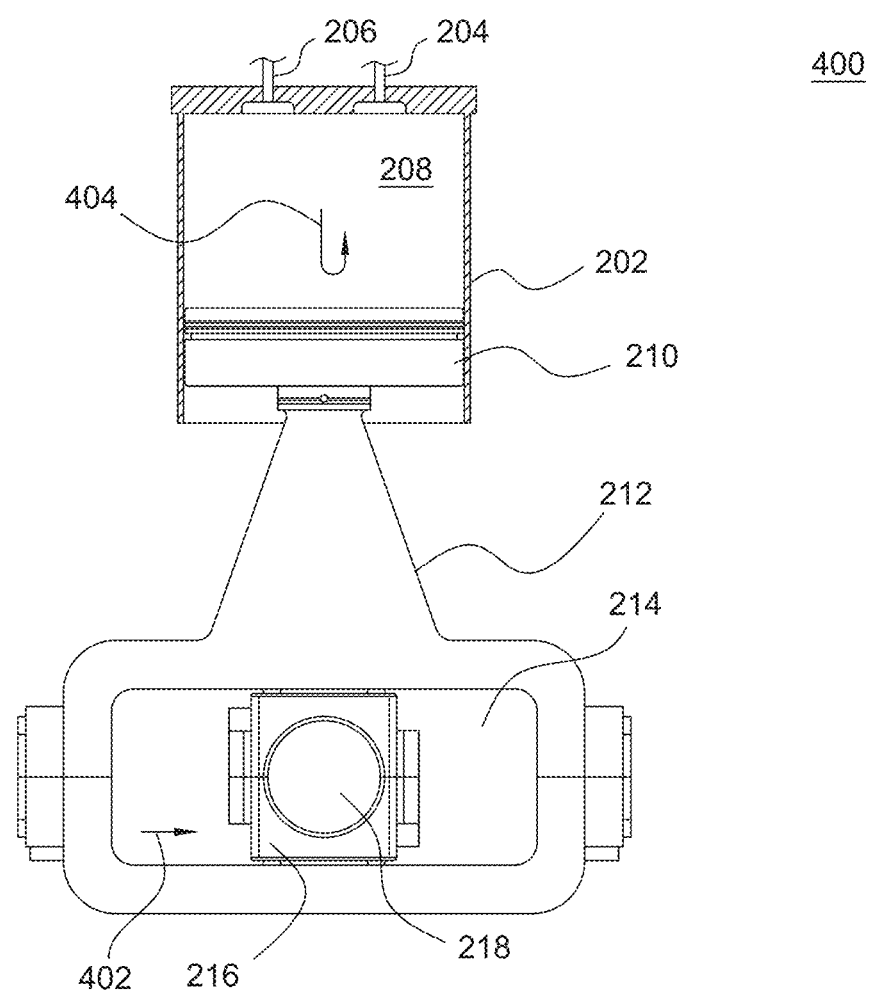
FIG. 4 is a side view of a cylinder unit at bottom dead center of a stroke, in accordance with some embodiments.

FIG. 4 is a side view 400 of a cylinder unit at bottom dead center of a stroke, in accordance with some embodiments. The connecting rod bearing housing assembly 216 is now back at the center of the transverse slot 214, such that the center of the journal hole 218 is directly under the center of the piston 210. Arrow 404 indicates that the piston has reached the bottom of a stroke and will be returning upwards subsequently.

Figure 5:
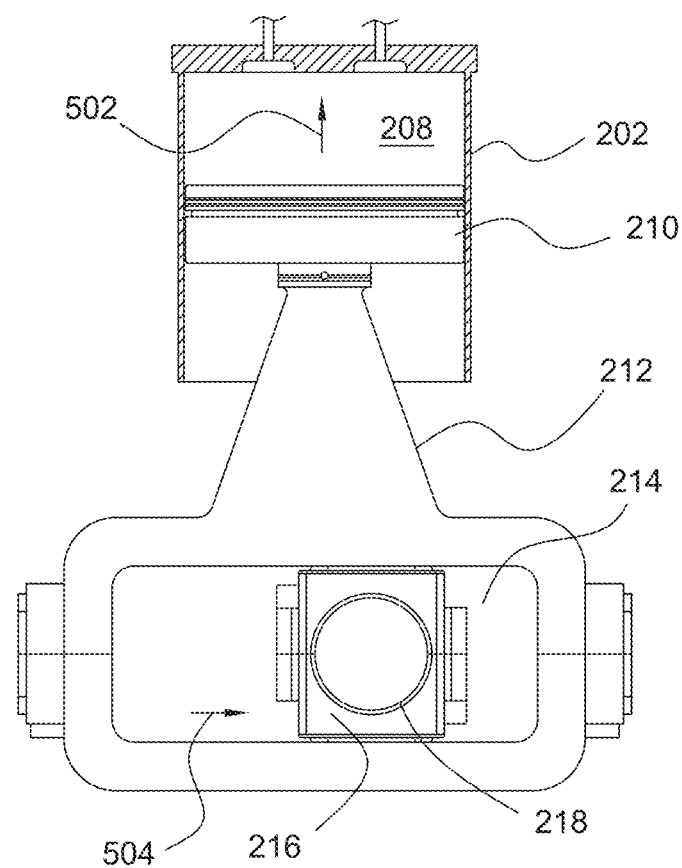
FIG. 5 is a side view of a cylinder unit at ninety degrees past bottom dead center of a stroke, in accordance with some embodiments.

FIG. 5 is a side view 500 of a cylinder unit at ninety degrees past bottom dead center of a stroke, in accordance with some embodiments. The piston 210 is halfway back up to the top of its stroke, as indicated by arrow 502. The connecting rod bearing housing 216 is moved to the right, as indicated by arrow 504, to the its farthest right position. Subsequently, as the piston 210 continues moving upwards, the connecting rod bearing housing assembly 216 will move to the left until the piston 210 and connecting rod bearing housing assembly 216 are in the same position as in FIG. 2.

Throughout the stroke cycle of FIGS. 2-5 (and back to FIG. 2), the piston 210 and piston connecting rod assembly 212 move only vertically, along the bore axis of the cylinder. The connecting rod bearing housing 216 reciprocates in the transverse slot 214, but moves in a circle which follows the circle of motion of the connecting rod journal of the crankshaft.

Figure 6:
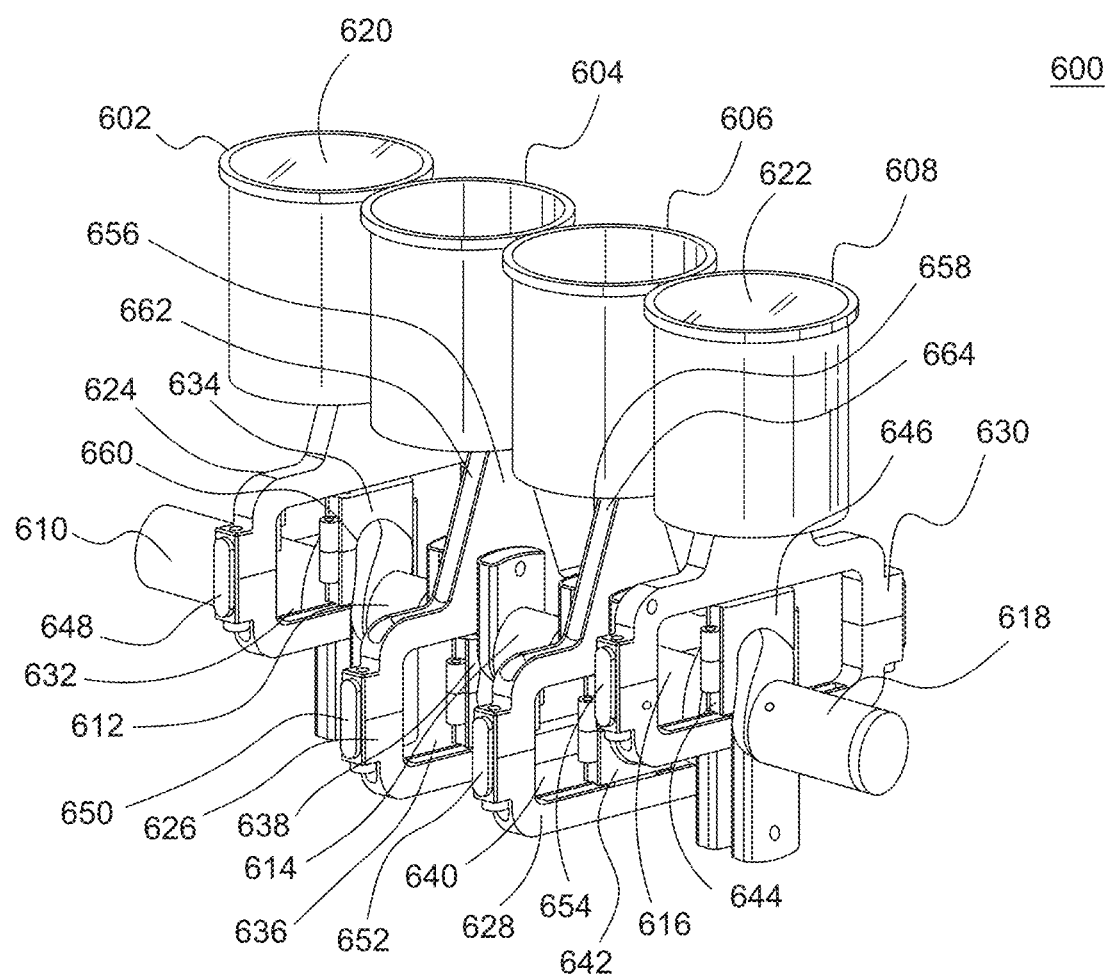
FIG. 6 is a perspective view of a four cylinder internal combustion engine having cylinder units in accordance with some embodiments.

FIG. 6 is a perspective view of a four cylinder internal combustion engine 600 having cylinder units in accordance with some embodiments. In particular there are four cylinder units 602, 604, 606, and 608 (shown here without a cylinder head) that are substantially equivalent to those shown in FIGS. 1-5. The outer two cylinder units 602, 608 are timed together, and the inner two cylinder units 604, 606 are timed together and one hundred eighty degrees offset from the outer cylinder units 602, 608. Each cylinder unit has a piston (e.g. piston 620 and piston 622), a piston connecting rod assembly, and a connecting rod bearing housing assembly, and is each connected to a crankshaft 610. The crankshaft includes main journals 612, 614, 616, and a drive end 618 for connecting to a transmission or flywheel assembly. Each cylinder unit includes a piston connecting rod assembly 624, 626, 628, 630 which each form a transverse slot 632, 636, 640, 644, respectively. A connecting rod bearing housing assembly 634, 638, 642, 646, respectively, is disposed in each slot 632, 636, 640, 644. As in FIGS. 1-5, the connecting rod bearing housing assemblies slide back and forth, transversely, in their respective slots, while also following the movement of their respective connecting rod journals (e.g. 660) which pass through the center of each connecting rod bearing housing assembly, and which are offset from a main axis of the crankshaft 610, as is known. On the outward-facing sides of each piston connecting rod assembly 624, 626, 628, 630 are slide bearings such as slide bearings 648, 650, 652, and 654, respectively, and corresponding slide bearings on the opposite sides of each piston connecting rod assembly 624, 626, 628, 630, which can't be seen in this view. The slide bearings 648-654 sit in tracks or grooves provides in portions of the crankcase/engine block to stabilize the piston connecting rod assemblies and ensure they only reciprocate vertically along the axis of the cylinder bore. In the inner cylinder units (e.g. for cylinders 604, 606) the connecting members 656, 658 can be seen. the sides of the connecting members can have grooves or channels 662, 664 to guide lubricant down to the slide bearings 650, 652, for example.

As can be seen, the inline four cylinder engine operates the pistons and crankshaft similar to a conventional engine, but the connecting apparatus of the piston connecting rod assembly and connecting rod bearing housing assembly for each piston is substantially different than the conventional connecting rod that causes the secondary imbalance. As a result, the disclosed arrangement avoids the secondary imbalance in conventional inline four cylinder engines, allowing for a greater displacement than can be reliably achieved with the conventional arrangement.

Figure 7:
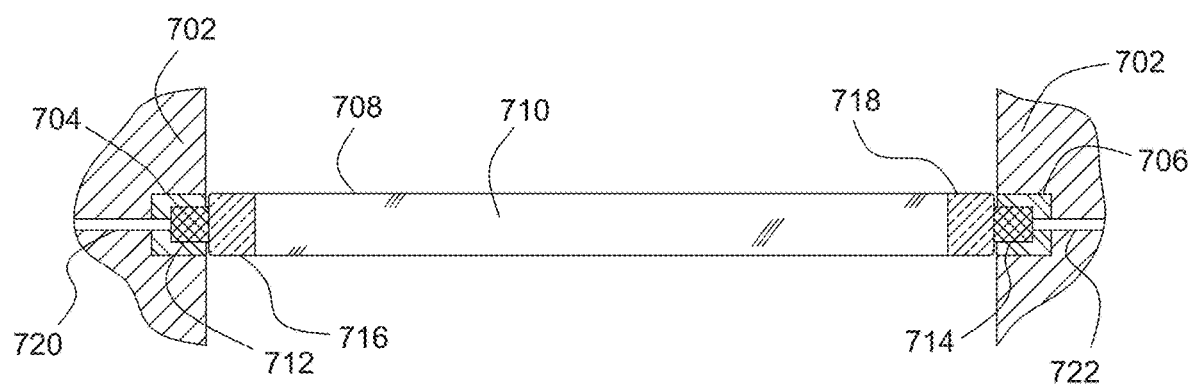
FIG. 7 is a top cutaway view of a yoke portion of a cylinder unit in a crankcase, in accordance with some embodiments.

FIG. 7 is a top cutaway view 700 of a yoke portion 708 of a cylinder unit in a crankcase 702, in accordance with some embodiments. The yoke portion is formed by the piston rod connecting assembly, which forms a slot defined partially by surface 710 in the piston rod connector assembly. The view 700 here is a cross section between the upper and lower portions of the piston connecting rod assembly (e.g. 110 and 112 of FIG. 1) from the vertical direction (into or out of the page, here). The crankcase 702 (or engine block) includes two opposing grooves or tracks 704, 706 in which the slide bearings 712, 714 (e.g. 648-654 of FIG. 6), respectively, reside. The slide bearings 712, 714 can be a ceramic bearing material such as silicon nitride or silicon carbide, and are captured in the grooves 704, 706, allowing the piston connecting rod assembly to only reciprocate vertically, preventing lateral or transverse movement. The surface 710 is therefore the lower surface of the transverse slot in the yoke portion. Sections 716 and 718 are the vertical portions of the yoke portion (i.e. portions of either the upper or lower connecting rod portions). In some embodiments there can be an oil or lubricant passage 720 formed through the yoke portion to the outward facing slide bearings.

Figure 8:
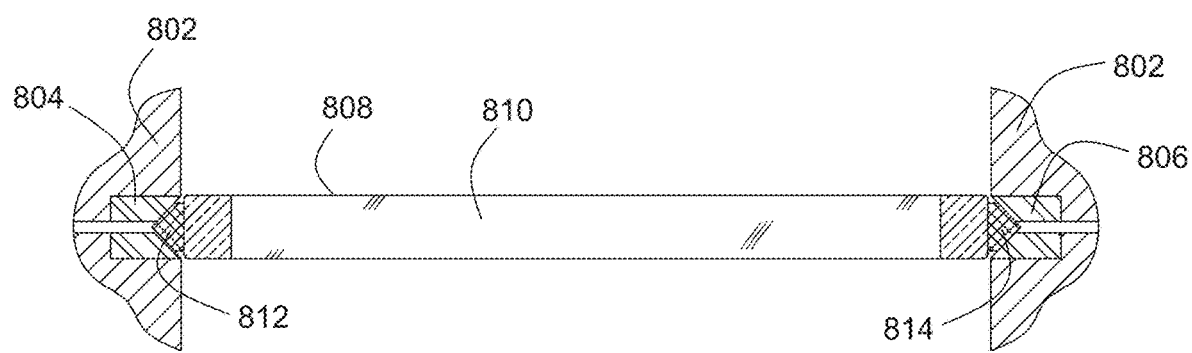
FIG. 8 is a top cutaway view of a yoke portion of a cylinder unit in a crankcase, in accordance with some embodiments.

FIG. 8 is a top cutaway view 800 of a yoke portion 808 of a cylinder unit in a crankcase, in accordance with some embodiments. The view 800 is similar to that of view 700, but shows the use of V-shaped grooves or tracks 804, 806 in the crankcase 802, and correspondingly shaped slide bearings 812, 814. The yoke portion 808 defines a slot 810 in which the connecting rod bearing housing assembly reciprocates.

Figure 9:
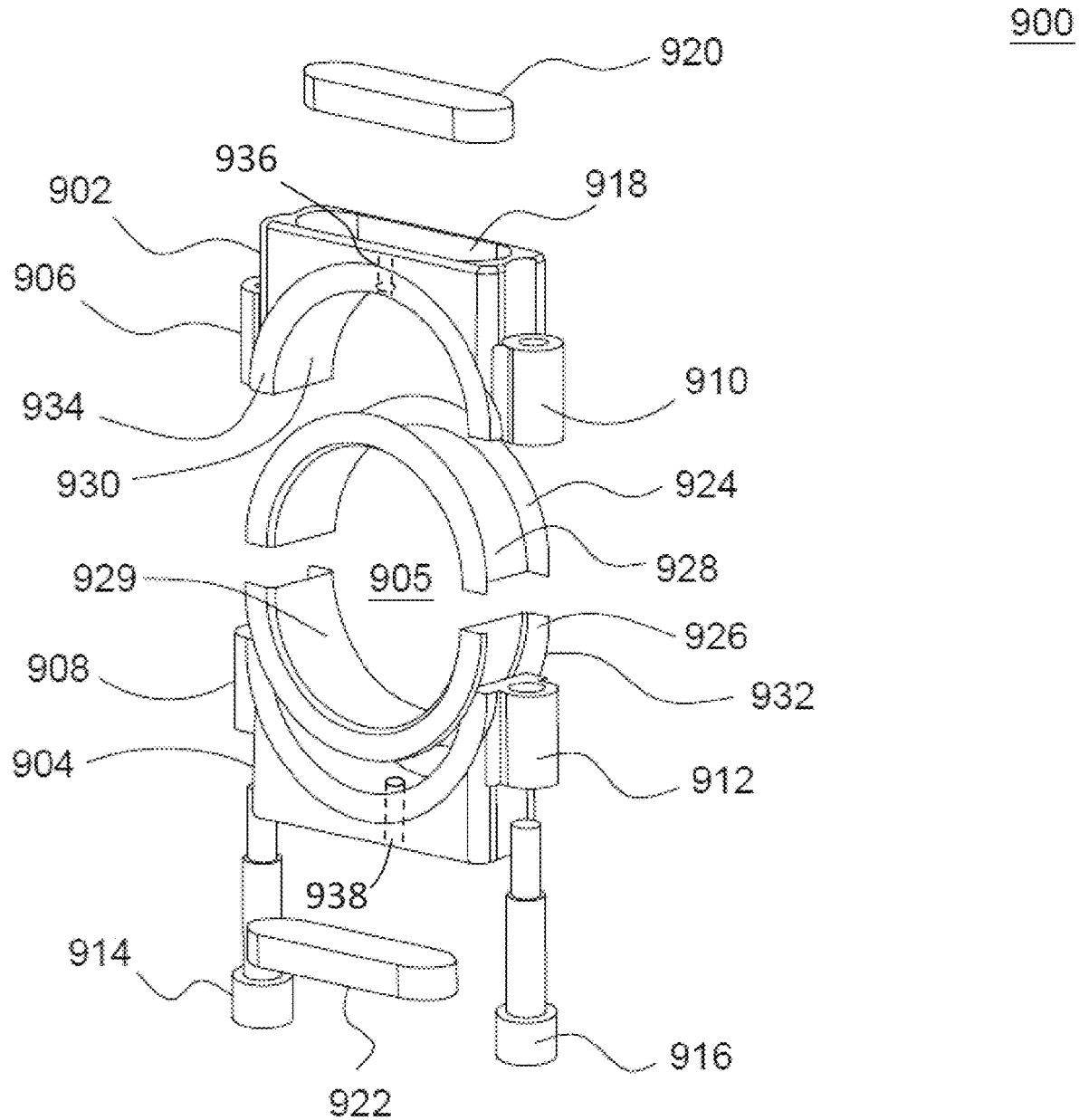
FIG. 9 is an isometric exploded view of a connecting rod bearing housing assembly using a thrust bearing arrangement, in accordance with some embodiments.

FIG. 9 is an isometric exploded view of a connecting rod bearing housing assembly 900 using a thrust bearing arrangement, in accordance with some embodiments. In FIG. 1, the connecting rod bearing housing assembly 136 uses semicircular journal bearings that are intended to be captured between the upper and lower portions 138, 140 by the crankshaft, and the slide bearings 150, 152 are shown as being captured in tracks 124, 126 which are grooves in the upper and lower connecting rod portions 110, 112. Connecting rod bearing housing assembly 900 uses a thrust bearing and does not reciprocate in the transverse slot of the connecting rod assembly in tracks. The connecting rod bearing housing assembly 900 include an upper portion 902 and a lower portion 904 which define an circular opening 905 through which a connecting rod journal of the crankshaft passes. The upper and lower portions 902, 904 can be coupled together by, for example, bolts 914, 916 which pass through bosses 906, 908 on first sides of the upper and lower portions 902, 904, and bosses 910, 912 on the second sides of the upper and lower portions 902, 904, respectively.

To allow the connecting rod bearing housing assembly to reciprocate in the transverse slot formed by the connecting rod assembly, slide bearings 920, 922 at the top and bottom, respectively, of the connecting rod bearing housing assembly 900 are provided in recesses like recess 918. The slide bearings 920, 922 slide on the top and bottom of the transverse slot as the connecting rod bearing housing assembly 900 reciprocates in the transverse slot of the connecting rod assembly.

To connect to the crankshaft, the assembly 900 can use a pair of semi-circular thrust bearings 924, 926, which form a complete circle around the connecting rod journal of the crankshaft. The thrust bearings 924, 926 each have an inner bearing surface (e.g. 929) that interface with the surface of the connecting rod journal of the crankshaft. Each thrust bearing 924, 926 also has an exterior surface (e.g. 928) that interfaces with the main journal bearing surface (e.g. 930) of the upper and lower portions 902, 904 of the connecting rod bearing housing assembly 900. The thrust bearings 924, 926 have sides (e.g. 932) that extend outward at the sides of the main bearing surfaces, perpendicular to the main bearing surfaces. The inner surface of the sides 932 interface with races 934 on the flank sides of the upper and lower portions 902, 904, encircling and bordering the circular opening 905. The outer surface of the sides 932 interface with portions of the crankshaft to keep the connecting rod bearing housing assembly 900 centered in the connecting rod assembly. The thrust bearing 924, 926 have features that direct oil from the crankshaft through the piston connecting rod potions, to slide bearings 920, 922.

Figure 10:
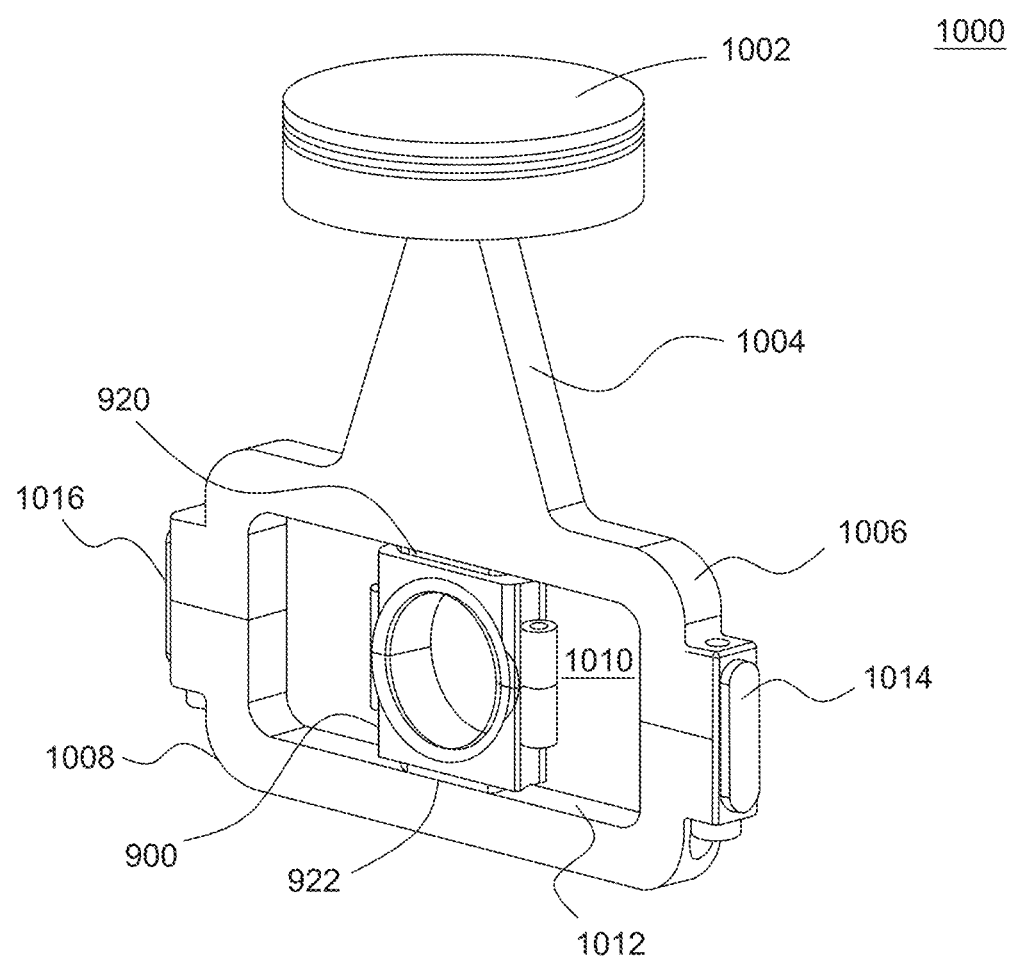
FIG. 10 is an isometric view of an assemble piston and connecting rod assembly using a connecting rod bearing housing having a thrust bearing, in accordance with some embodiments.

FIG. 10 is an isometric view of an assembled piston and connecting rod assembly 1000 using a connecting rod bearing housing 900 having a thrust bearing, in accordance with some embodiments. This view represents embodiments similar to that of FIG. 1, but which use a thrust bearing arrangement, and without tracks in transverse slot 1010 formed between the upper and lower connecting rod portions 1006, 1008. The upper connecting rod portion 1006 includes connecting member 1004 that connects to a piston 1002. The piston 1002, and connecting rod portions 1006, 1008 move in a vertical direction only (i.e. along the cylinder bore axis). The connecting rod bearing housing assembly 900 reciprocates in the slot 1010, moving perpendicularly to the axis of motion of the connecting rod assembly 1000, with respect to the connecting rod assembly 1000, but also in a circular motion by following the circular path of the crankshaft at the connecting rod journal. The slide bearings 920, 922 in the top and bottom of the connecting rod bearing housing 900 interface with top surface of the transverse slot 1010 from by the upper portion 1006, and with a bottom surface 1212 of the slot formed by the bottom portion 1008. There is no track or grove in which the slid bearing 920, 922 travel, rather, the connecting rod assembly is only allowed to move vertically by the piston 1002 being captured in the cylinder, and the outer slide bearings 1014, 1016 of the connecting rid assembly 1000 being captured in respective tracks in the crankcase. The thrust bearing arrangement maintains the connecting rod bearing housing assembly 900 centered transversely in the slot 1010 as the connecting rod bearing housing assembly 900 reciprocates within the slot 1010. The arrangement of FIG. 10 can be repeated for additional cylinder units.

Figure 11:
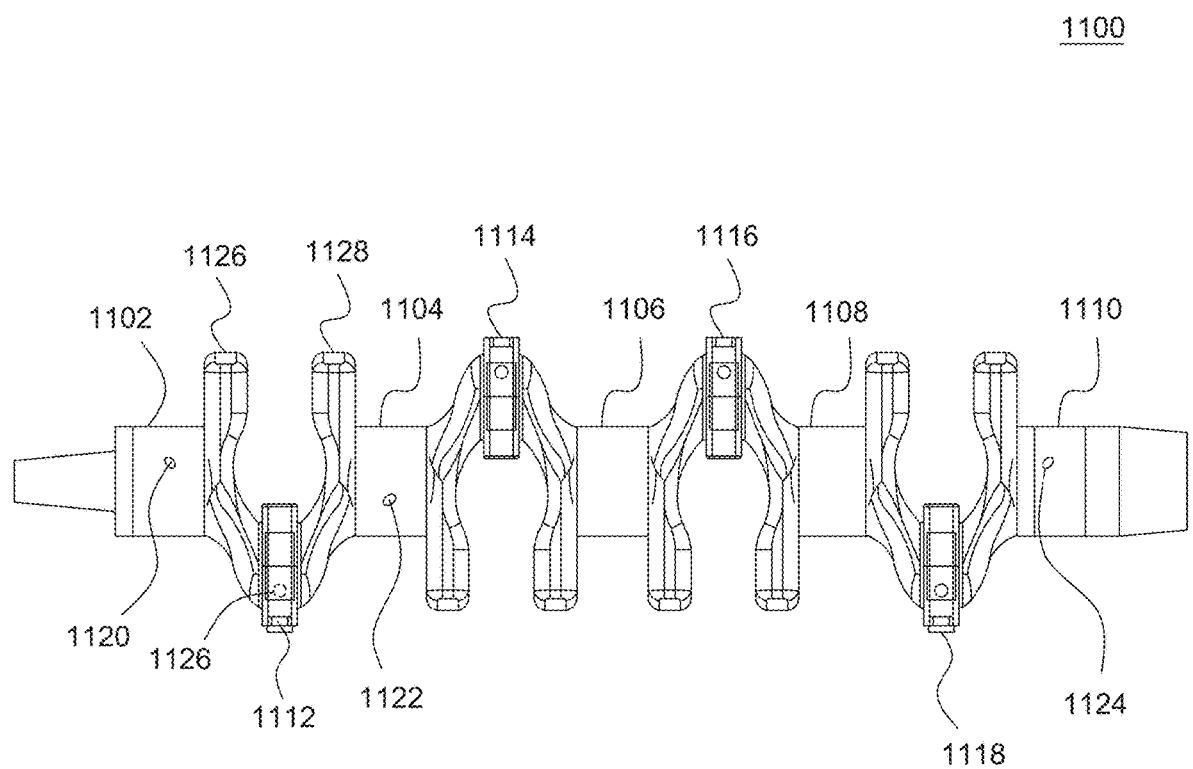
FIG. 11 is a crank assembly including a crankshaft with connecting rod bearing housings assembled in the connecting rod journals, in accordance with some embodiments.

FIG. 11 is a crank assembly 1100 including a crankshaft 1102 with connecting rod bearing housing assemblies 1112, 1114, 1116, 1118 on the connecting rod journals of the crankshaft 1102, in accordance with some embodiments. The connecting rod bearing housing assemblies 1112, 1114, 1116, 1118 are assembled around the connecting rod journals, and reside in the transverse slot of the yoke formed by each corresponding connecting rod assembly. The crankshaft also has main journals 1104, 1106, 1108, and 1110. Oil or other lubricant is provided to the connecting rod bearing housing assemblies 1112, 1114, 1116, 1118 though passages in the crankcase, 1102, through openings 1120, 1122, 1124 in the main journals, which connect to similar openings in the connecting rod journals. Lubricant is pumped through the openings 1120, 1122, 1124 by, for example, an oil pump. The lubricant provides lubricant at the journal bearings, and passages 936, 938 of FIG. 9 can be formed in the upper and lower portions of the connecting rod bearing housing assemblies to allow lubricant to reach the top and bottom slide bearings through a passage 1126 that allows oil to seep around the slide bearing on the top and bottom portions of the connecting rod bearing housings. Also, oil splash in the crankcase can be utilized to lubricate the slide bearings in the transverse slot, as well as on the outsides of the connecting rod assembly (e.g. 1014, 1016).

Figure 12:
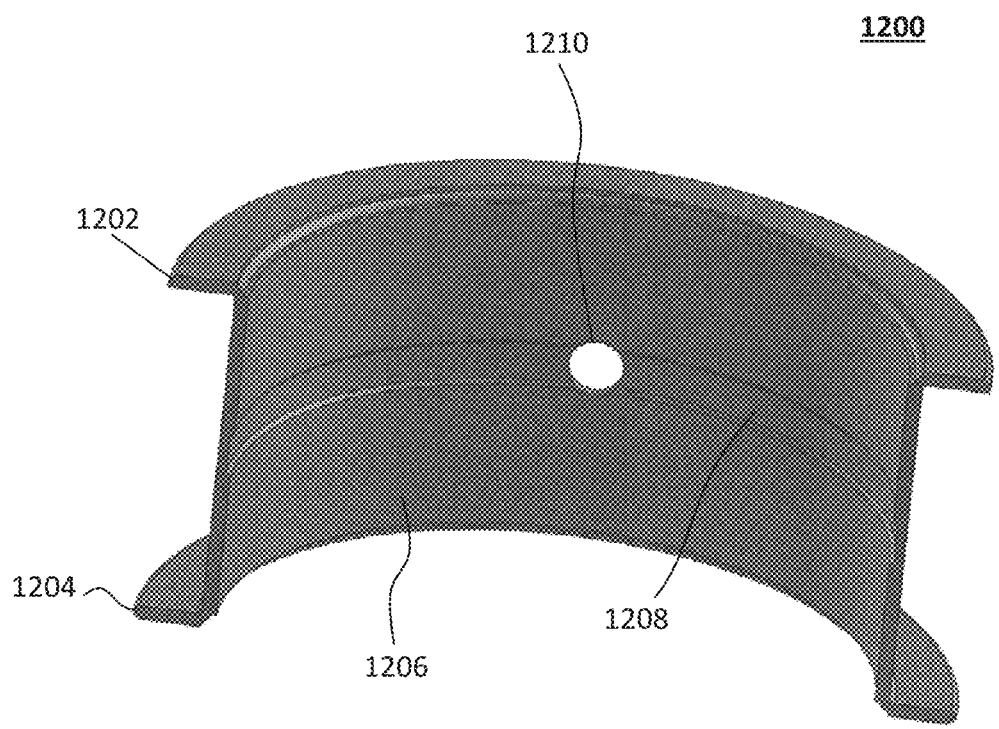
FIG. 12 is a bottom perspective view of a thrust bearing for use in a connecting rod assembly, in accordance with some embodiments.

FIG. 12 is a bottom perspective view of a thrust bearing 1200 for use in a connecting rod assembly, in accordance with some embodiments. The thrust bearing 1200 can be used in the assembly of FIG. 9, as thrust bearings 924, 926. The thrust bearing includes sides 1202, 1204 that extend outward and are configured to interface with the crankshaft and the races (e.g. 934) on the flank sides of the upper and lower portions of the connecting rod bearing assembly (e.g. 902, 904). On the inner surface 1206 that interfaces with the crank journal there is an oil channel 1208 formed along the center of the inner surface 1206, following the half circle of the inner surface 1206. An opening 1210 is formed from the channel 1208 to the exterior or outside of the thrust bearing 1200. The opening 1210 can be formed at the mid-point of the channel 1208. Oil from the crankshaft, which is under pressure, is distributed to the inner surface 1206 of each thrust bearing 1200, and will form a layer between the inner surface 1206 and the crank journal. Some of the oil will pass to the sides 1202, 1204 on the outward facing surfaces between the sides 1202, 1204 and the crankshaft, and some of the oil will collect in the channel 1208 and pass through the opening 1210 to lubricate the exterior or outer surface (facing away as drawn) as well as to provide oil to the slider bearings on the top and bottom of the connecting rod bearing assembly.

Figure 13:
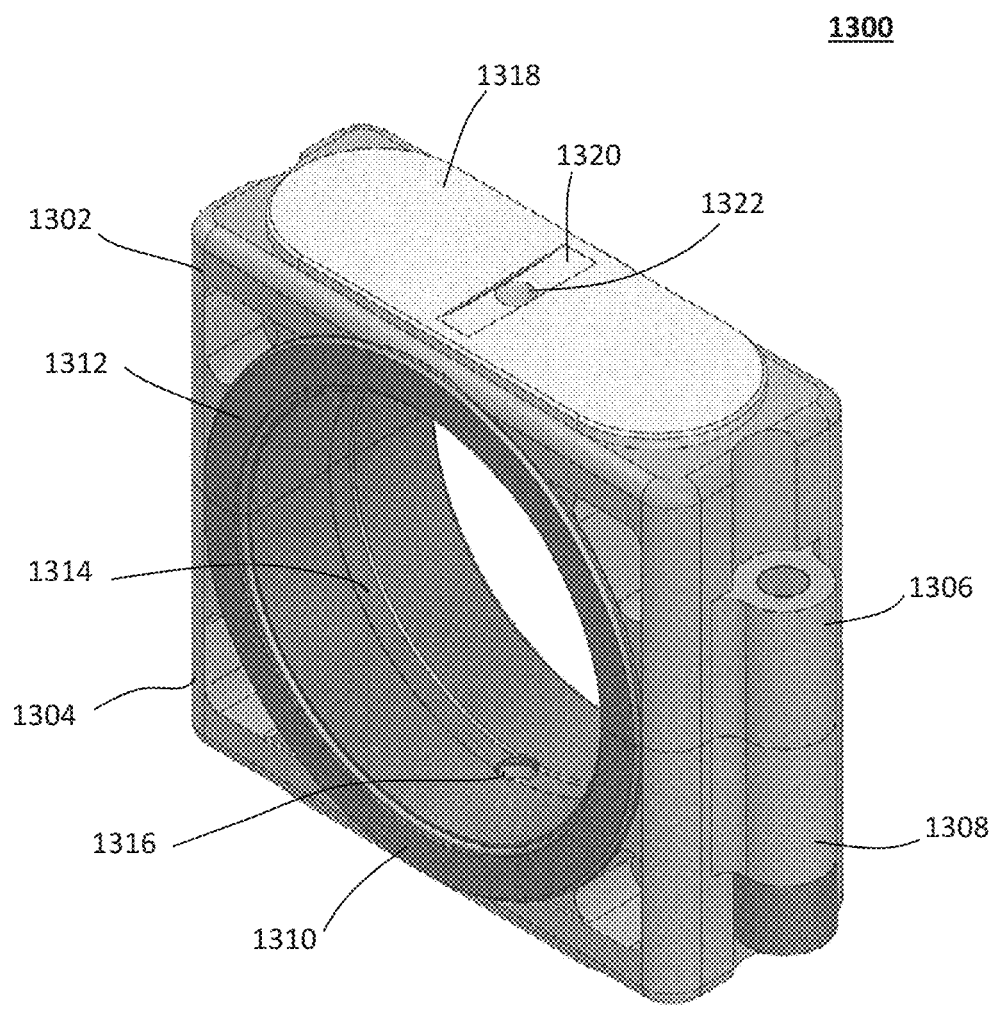
FIG. 13 is a perspective view of an assembled connecting rod bearing housing assembly, in accordance with some embodiments.

FIG. 13 is a perspective view of an assembled connecting rod bearing housing assembly 1300, in accordance with some embodiments. The assembly 1300 includes an upper portion 1302 and a lower portion 1304. The two portions 1302, 1304 can be joined by a bolt in threaded bosses 1306, 1308 and similar features on the opposite side of the assembly 1300. A circular opening is formed in the center of the assembly 1300, in which a pair of semi-circular thrust bearings 1310, 1312 are mounted, which interface with the crank journal of the crankshaft. Each trust bearing 1310, 1312 can be substantially formed like that shown in FIG. 12 and include a channel 1314 and oil passage opening 1316. Oil is provided through an opening in the crankshaft journal (e.g. 1126), which distributes over the surfaces of the thrust bearings, and through oil passages (e.g. 936, 938) in the upper and lower portions 1302, 1304 of the assembly 1300. The oil passages align with passage in the slider bearings (e.g. 1318) such as passage 1322 to allow oil to reach the exterior surface of the slider beating 1318, and the corresponding slider bearing on the bottom of the assembly 1300, which is not in view in this drawing. The shallow groove 1320 across the width of the slider bearing 1318, can help distribute oil evenly across the exterior surface of the slider bearing.

Figure 14:
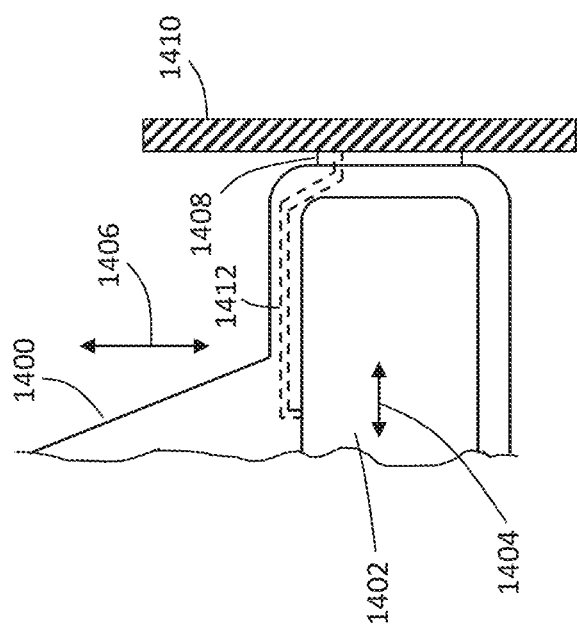
FIG. 14 is a side view of a portion of a piston connecting rod assembly in an engine block showing a lubrication passage through the piston connecting rod assembly, in accordance with some embodiments.

FIG. 14 is a side view of a portion of a piston connecting rod assembly 1400 in an engine showing an oil passage through the connecting rod, in accordance with some embodiments. The piston connecting rod assembly 1400 forms a transverse slot 1402 in which the connecting rod bearing assembly (not shown here) is seated, as previously described, and which moves transversely, as indicated by arrow 1404. The piston connecting rod assembly 1400 moves in an oscillating manner in the vertical direction, as indicated by arrow 1406. As previously described, on the side end of the piston connecting rod assembly 1400 there are slider bearings such as slider bearing 1408. In some embodiments a series of cylindrical roller bearings may be used instead. The slider bearing 1408 interfaces with a guiding structure 1410 (shown here in cut-away) formed in the engine or engine block. The guiding structure 1410 can be a groove or track or the like. An oil channel 1412 provides oil under pressure to the slider bearing surface to create lubrication between the slider bearing 1408 and the guiding structure 1410. Using the connecting rod bearing housing of FIG. 13, for example, oil is provided through the crank journal to lubricate the thrust bearing and the slider bearing on top and bottom of the connecting rod bearing housing. Oil under pressure moves through the slider bearing (e.g. 1322) to feed oil into the oil channel 1412 in the piston connecting rod assembly 1400.

Figure 15:
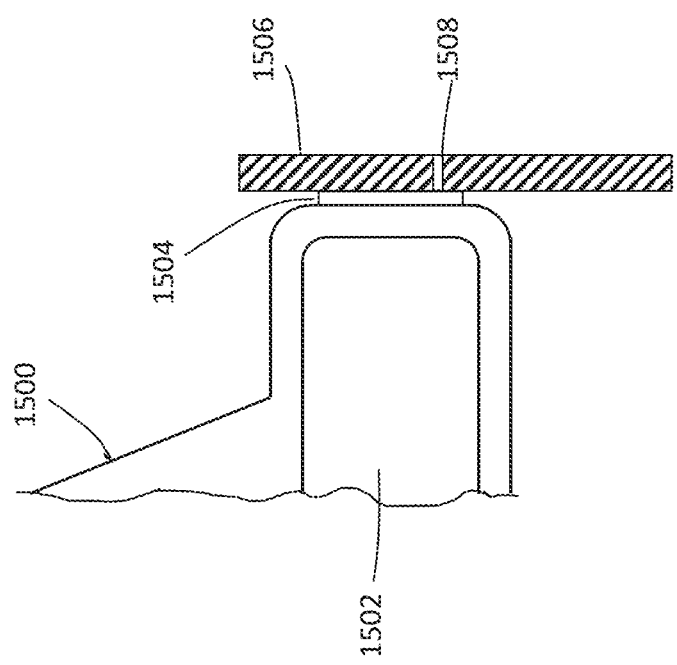
FIG. 15 is a side view of a portion of a piston connecting rod assembly in an engine block showing a lubrication passage through the engine block, in accordance with some embodiments.

FIG. 15 is a side view of a portion of a piston connecting rod assembly 1400 in an engine showing an oil passage through the engine block, in accordance with some embodiments. In this configuration, the piston connecting rod assembly 1500 include a transverse slot 1502 in which a connecting rod bearing assembly is located to slide transversely. A slider bearing 1504 interfaces with a track 1506 in the engine block. A oil passage 1508 provided oil under pressure to lubricate the interface between the slider bearing 1504 and the bearing surface of the track 1506.

FIG. 16 is a plan view of a slider bearing 1504 used on the side of a piston connecting rod assembly, in accordance with some embodiments. In this view the slider bearing 1504 is turned 90 degrees about a vertical axis from the orientation shown in FIG. 15, and is removed from the piston connecting rod assembly. The slider bearing 1504 has rounded semi-circular ends 1602, 1608. The circular shape of end 1602 has a center 1604 that is equidistant to every point along the end 1604. Likewise, end 1608 has a center 1610. When the piston connecting rod assembly is at bottom dead center of its stroke, then center 1604 will be aligned with the oil passage 1508 in the guiding structure 1506. When the piston connecting rod assembly is at top dead center of the stroke, then center 1610 will be aligned with the oil passage 1508.

An engine configuration has been disclosed that uses four in-line unopposed cylinder units having what is known as a Scotch yoke for each cylinder unit. Engines using a Scotch yoke design conventionally employ an opposing cylinder unit arrangement, but the disclosed inventive arrangements allow for use of the yoke in more conventional in-line engine arrangements, and as a result, the typical secondary forces produced in conventional in-line four cylinder engines are eliminated, allowing larger displacement engines and higher revving engines in an in-line four cylinder arrangement over that of conventional in-line four cylinder engines. Each cylinder unit includes a connecting rod assembly having an upper portion that connects to the piston, and a lower portion that connects to the upper portion of the connecting rod assembly. The upper and lower portions of the connecting rod assembly form a transverse slot in which a connecting rod bearing housing assembly is disposed, which reciprocates in the slot with the stroke of the cylinder unit. The connecting rod assembly is captured on the ends of the yoke by slide bearings that are disposed in tracks in the crankcase. As a result, the motion of the connecting rod assembly is entirely linear, while the connecting rod bearing housing assembly reciprocates in a perfect circle around the axis of the crankshaft, and as a result, there is no secondary force produced by the reciprocating parts, as in a conventional in-line four cylinder engine.

What is claimed is:

1. An internal combustion engine arranged in an in-line four cylinder configuration, comprising:
    four in-line, unopposed identical cylinder units;
    each cylinder unit having:
        a piston disposed in a respective bore that reciprocates within the respective bore;
        a piston connecting rod assembly that reciprocates exclusively along the axis of the bore in correspondence with the piston, the piston connecting rod assembly having a yoke portion defining a transverse slot that is transverse to the axis of the bore and having a connecting member that connects the yoke portion to the piston;
        a connecting rod bearing housing that is mounted in the transverse slot and that is configured to reciprocate within the transverse slot, and which forms a circular opening through the connecting rod bearing housing perpendicular to the direction of reciprocation in the transverse slot from a first side of the connecting rod bearing housing to a second side of the connecting rod bearing housing, wherein a first circular race is formed around the circular opening on the first side of the connecting rod bearing housing and a second circular race is formed around the circular opening on the second side of the connecting rod bearing housing;
        a thrust bearing assembly disposed in the circular opening of the connecting rod bearing having a bearing surface configured to mate with a connecting rod journal, and wherein thrust bearing assembly has a first side and a second side, wherein an inner portion of the first side mates with the first race and an inner portion of the second side mates with the second race, and an outer surface of the first side and second side of the thrust bearing assembly is configured to interface with a portion of a crankshaft to keep the connecting rod bearing housing centered in the piston connecting rod assembly; and
        an upper slider bearing disposed on a top of the connecting rod bearing housing between the connecting rod bearing housing and an upper surface of the transverse slot in the yoke portion, and a lower slider bearing disposed on a bottom of the connecting rod bearing housing between the connecting rod bearing housing and a lower surface of the transverse slot in the yoke portion, wherein the top and bottom of the connecting rod bearing housing and the upper and lower surfaces of the transverse slot lack a centering track; and
    wherein during operation of the internal combustion engine there are no secondary forces created on the crankshaft.

2. The internal combustion engine of claim 1, wherein the plurality of in-line, unopposed cylinder units is four unopposed cylinder units wherein an inner pair of the cylinder units is timed 180 degrees offset from an outer pair of cylinder units.

3. The internal combustion engine of claim 1, wherein the yoke portion of each piston connecting rod assembly includes an outward facing slide bearings on opposing ends of the yoke portion that interface with guides in a crankcase that prevent lateral movement of the piston connecting rod assembly.

4. The inline four cylinder engine of claim 3, wherein the connecting rod assembly is comprised of an upper portion including the connecting member, and a lower portion, wherein each of the upper and lower portions respectively form half of the yoke portion.

5. The internal combustion engine of claim 1, further comprising an oil passage formed through the connecting rod bearing housing configured to pass oil to the upper slider bearing and the lower slider bearing.

6. The internal combustion engine of claim 5, further comprising oil passages form at each end of the yoke portion, from the transverse slot to an exterior side of the yoke portion.

7. The internal combustion engine of claim 1, wherein the connecting member has a triangular shape with a widest portion at a base where the connecting member joins to the yoke portion.

8. The internal combustion engine of claim 7, wherein the connecting member is integrally formed with an upper half of the yoke portion.

9. An in-line four cylinder engine in which there is no secondary imbalance, comprising:
    exactly four cylinder units, each cylinder unit having:

a cylinder bore having a bore axis;

a piston configured to reciprocates within the cylinder bore along the bore axis;

a piston connecting rod assembly that reciprocates exclusively along the bore axis with the piston, the piston connecting rod assembly having a yoke portion defining a transverse slot that is transverse to the bore axis and having a connecting member that connects the yoke portion to the piston, and further having an outward facing slide bearing disposed on a first end side of the yoke portion and a second end side of the yoke portion which are each respectively configured to interface with a vertical track in a crankcase of the internal combustion engine;

a connecting rod bearing housing that is mounted in the transverse slot and that is configured to reciprocate within the transverse slot, and which forms a circular opening through the connecting rod bearing housing perpendicular to the direction of reciprocation in the transverse slot from a first side of the connecting rod bearing housing to a second side of the connecting rod bearing housing, wherein a first circular race is formed around the circular opening on the first side of the connecting rod bearing housing and a second circular race is formed around the circular opening on the second side of the connecting rod bearing housing;

a thrust bearing assembly disposed in the circular opening of the connecting rod bearing having a bearing surface configured to mate with a connecting rod journal, and wherein the thrust bearing assembly has a first side and a second side, wherein an inner portion of the first side mates with the first race and an inner portion of the second side mates with the second race, and an outer surface of the first side and second side of thrust bearing assembly are configured to interface with a portion of a crankshaft to center the connecting rod bearing housing in the piston connecting rod assembly; and wherein a top and a bottom of the connecting rod bearing housing, and an upper surface and a lower surface of the transverse slot, lack any centering track; and wherein an inner pair of the four cylinder units is timed 180 degrees offset from an outer pair of the four cylinder units and wherein during operation of the in-line four cylinder engine there are no secondary forces exerted on the crankshaft by the four cylinder units.

\* \* \* \* \*